United States Patent [19]

Illy

[11] 4,253,385
[45] Mar. 3, 1981

[54] COFFEE MACHINE

[76] Inventor: Ernesto Illy, 8, via V. Locchi, Trieste, Italy

[21] Appl. No.: 33,815

[22] Filed: Apr. 27, 1979

[30] Foreign Application Priority Data

May 3, 1978 [IT] Italy .............................. 21703/78[U]

[51] Int. Cl.³ .................... A47J 31/14; A47J 31/36
[52] U.S. Cl. .................................. 99/281; 99/295
[58] Field of Search ............... 99/295, 302 R, 302 P, 99/303, 279, 280, 281, 282, 283

[56] References Cited

U.S. PATENT DOCUMENTS

| | | | |
|---|---|---|---|
| 2,715,868 | 8/1955 | Brown | 99/302 R |
| 2,935,011 | 5/1960 | Perlman | 99/302 P |
| 3,085,495 | 4/1963 | Rosander | 99/302 R |
| 3,098,424 | 7/1963 | Perucca | 99/302 R |
| 3,278,087 | 10/1966 | Stasse | 99/302 R |
| 3,423,209 | 1/1969 | Weber | 99/283 |
| 3,450,024 | 6/1969 | Martin | 99/295 |
| 3,583,308 | 6/1971 | Williams | 99/302 R |

FOREIGN PATENT DOCUMENTS 314618 2/1934 Italy ........................ 99/302 R

*Primary Examiner*—Robert W. Jenkins
*Attorney, Agent, or Firm*—Karl H. Gross

[57] ABSTRACT

The invention relates to a coffee brewing machine which is particularly suitable for family use and for a small commercial establishment, such as a refreshment room. The machine extracts the coffee beverage from a pod which contains ground coffee and is housed in a chamber defined by an upper block and by a removable lower box, between a jet-forming member fixed to the upper block and a filter housed in the removable lower box. It includes a water container, a heater and a pump which supplies the water to the chamber at the proper temperature and pressure. In the chamber the water penetrates the pod and extracts the coffee beverage therefrom and then the coffee beverage flows out of the machine.

9 Claims, 1 Drawing Figure

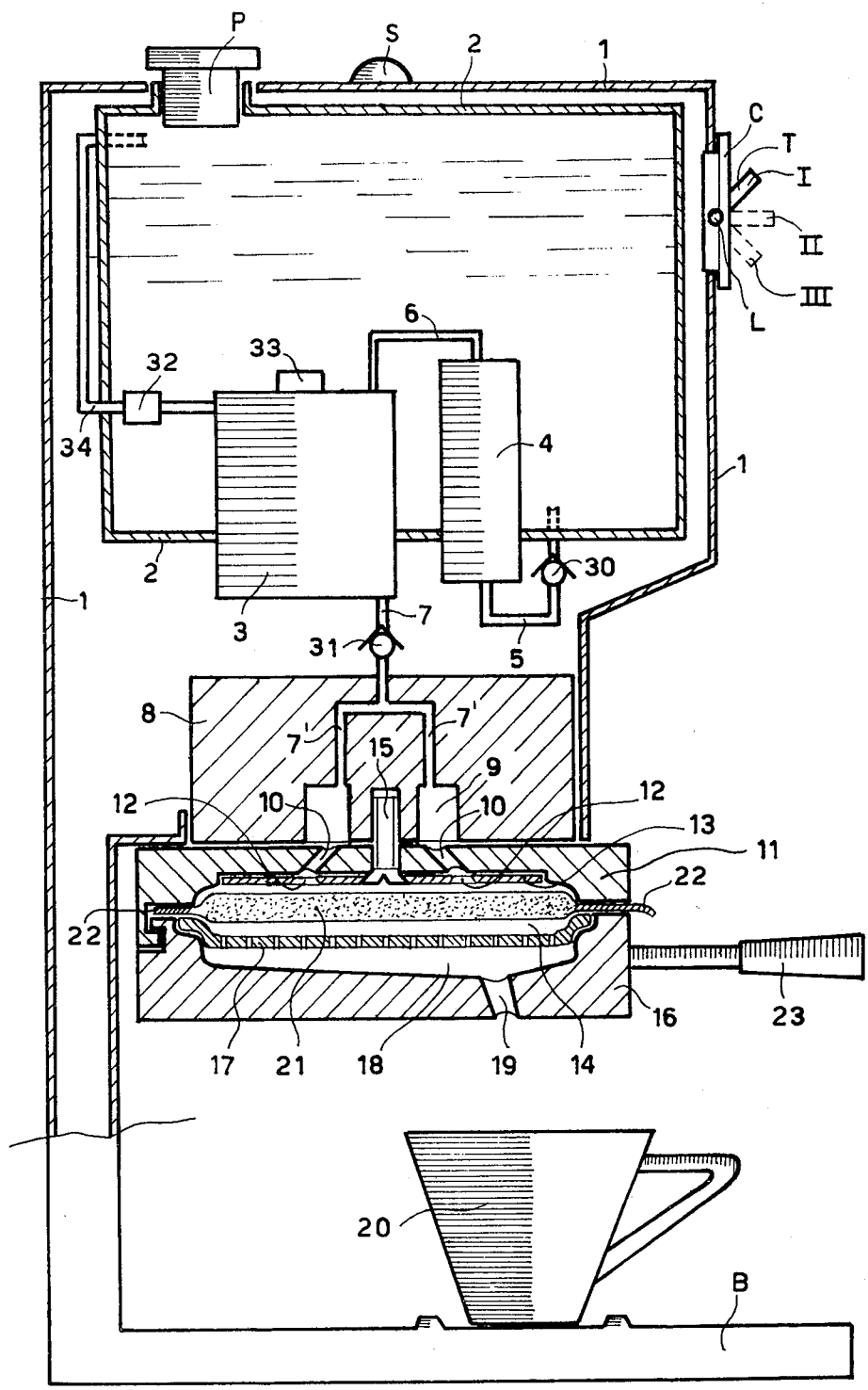

COFFEE MACHINE

BACKGROUND OF THE INVENTION

1. Field of the Invention

The present invention relates to a coffee machine.

More particularly, the invention is concerned with a coffee machine which is especially well suited for domestic use and for small commercial establishments, i.e. for applications where relatively small quantities of coffee are consumed during any given period of time.

2. The Prior Art

Coffee machines, i.e. machines for brewing coffee, are well known both for large-scale applications (large commercial users) and for small-scale applications (households; small commercial users). By contrast to percolators and analogous devices these machines—known as "espresso machines"—all operate on the principle that a user places a quantity of ground coffee from a supply into a filter, whereupon a stream of hot water is passed through the coffee to become converted into coffee beverage.

There is nothing wrong with the mechanical performance of these machines. They do, however, have a variety of undesirable characteristics which make them less than perfect for use in households and small commercial establishments. In particular, the coffee grounds must be removed from the filter after brewing, and the filter be washed; this causes dirt and disorder. Coffee must first be placed into the filter from a supply, and the grounds must subsequently be removed and the filter cleaned; this is time-consuming and especially the removal of the grounds and cleaning of the filter is often considered to be an onerous chore.

Moreover, with these known machines it is not possible to assume that the taste of the coffee beverage is uniform from one time to the next, because the quantity and quality of ground coffee used, the degree of compaction of the ground coffee in the filter (which influences the flow rate of the water and the extraction of aromatics) and the handling of the machine itself are all factors which are not constant.

SUMMARY OF THE INVENTION

Accordingly, it is an object of the invention to overcome the disadvantages of the prior art.

More particularly, it is an object of the present invention to provide an improved coffee machine which is not possessed of the prior-art disadvantages.

Another object is to provide an improved coffee machine wherein coffee beverage (one or more cups) is brewed from a pre-measured, pre-packaged quantity of ground coffee which, because of these circumstances, can be of uniform quantity, quality and compaction.

Still a further object is to provide such a coffee machine which brews coffee from pods or cartridges containing a pre-measured quantity of ground coffee.

A concomitant object is to provide an improved coffee machine of the type here under discussion which requires no handling of loose ground coffee or of coffee grounds, needs a minimum of cleaning and of routine maintenance, and which delivers coffee beverages of uniform taste during each instance of use.

Pursuant to the above objects, and still others which will become apparent from a reading of the description following hereafter, one object of the invention resides in a coffee machine which, briefly stated, comprises a housing having a reservoir for water; means on the housing forming a chamber having an inlet and an outlet and including a removable cover for the chamber; means for removably holding in the chamber a water-permeable cartridge containing a beverage-making substance; electrically energized means for heating water from the reservoir; and means for forcing the heated water under pressure through the inlet and the cartridge in the chamber, so as to brew a beverage which leaves the chamber through the outlet.

Pods or cartridges, where a precisely metered quantity of ground coffee is accomodated in an envelope of water-permeable filter paper, are known. These are made commercially and packed in air-tight containers, either in a vacuum or under an inert protective gas (e.g. argon). At present, such cartridges are made to permit brewing of a single cup of coffee, but it is evident that they can be made larger to brew any desired number of cups of the beverage from each cartridge.

The novel features which are considered as characteristic for the invention are set forth in the appended claims. Both the construction and method of operation of the invention, as well as additional objects and advantages thereof, will however be best understood from the following description of specific embodiments in connection with the accompanying drawings.

BRIEF DESCRIPTION OF THE DRAWING

The sole FIGURE is a somewhat diagrammatic vertical section through a machine according to the invention.

DESCRIPTION OF PREFERRED EMBODIMENTS

Illustrated in the FIGURE is an exemplary embodiment of a coffee machine according to the invention. It has a housing 1 of any desired shape and material. A water container or reservoir 2 (of e.g. metal or synthetic plastic material) is accomodated in the housing 1 to which it is connected in any suitable per se known manner. Housing 1 and container 2 have common inlet openings for the admission of water; the opening can be closed by a plug P.

The casing of an electric resistance heater 3 may, but need not be, partially located in the container 2, in order to conserve space and reduce the overall size of the machine; the resistance heating element of the heater 3 is known per se and therefore not shown. Also known per se is an electrically operated pump 4 which may (but need not) be partly located in the container 2 for the same reasons as heater 3. Pump 4 communicates with container 2 via a conduit 5 in which a one-way valve 30 is interposed; it also communicates with the interior of the casing of heater 3 via a conduit 6.

An operating panel C is accessible at the exterior of housing 1 and in the illustrated embodiment has a switch L provided with a toggle T which can be moved between the positions I, II and III. A flexible electric line cord (not shown) supplies power via switch L to the heater 3, pump 4 and an indicator light S. No circuit diagram is needed to understand this simple electrical circuit.

To operate the machine a user moves toggle T from the rest position I to the position II in which power is supplied to the resistance element of heater 3, causing the element to heat up; at the same time, power is supplied to the lamp S so that the same lights up. A thermostat 33 is connected in circuit with the heater 3 and pump; when it senses after a few seconds that the water in the casing of the heater 3 has reached the required temperature—usually about 80° to 90° C.—the thermostat interrupts the flow of energy to the heater 3 and also to lamp S. As a result the lamp S is extinguished and thereby signals the user that the water is ready for coffee brewing. The user now moves the toggle T to position III, thereby connecting the pump 4 to the electrical energy source. Water is now drawn through conduit 5 into the suction side of pump 4 and expelled from its pressure side via conduit 6 into the heater 3, in the process displacing hot water from heater 3. The water in heater 3 will be subjected to the requisite pressure—usually about 8–10 atmospheres—almost immediately on start-up of the pump and will be expelled from heater 3 via conduit 7 and through the one-way valve 31, into a distribution block 8.

The block 8 is provided with a plurality of passages 7' (e.g. arranged in an annular pattern) communicating with conduit 7 and with an annular distributing chamber 9. Arranged below the block 8 is a further block 11 formed with a downwardly open recess. A third block 16 is detachably mounted below the lower open side of the recess and in turn provided with an upwardly open recess 18. Together, the two recesses define a filtration chamber 14. A baffle member 13 is mounted in the recess of block 11, by means of a screw 15 which also serves to secure the block 8. The block 11 and member 13 are readily detachable from block 8 to permit periodic cleaning of chamber 9 and the members 11, 13 including ducts 10 in the member 11 which communicates with the branches 7' and openings 12 in the baffle member 13.

The recess in the block 16 is subdivided by a filter 17 into an upper part and a lower part 18 having a bottom wall which slopes down towards an outlet 19. Below the outlet 19 the base B of the machine is provided with a space for standing a cup 20 or other receptacle for the brewed beverage.

Block 16 may be easily connected to and disconnected from, the block 11 by manual manipulation and via means known per se (e.g. a sliding connection or a bayonet coupling), which makes for quick manipulation.

A pod or cartridge 21 (analogous to a teabag) is inserted into the chamber 14 defined by the members 11, 16 so as to be located above filter 17 and below member 13. The edge portions of cartridge 21 are clamped between the engaging surfaces of elements 11, 16 to hold the cartridge in place and to prevent leaking of water from between these surfaces. Additional sealing means known per se, may also be provided for this purpose on the member 11 and/or 16.

Hot water expelled from the heater 3 under the influx of new water being forced in by the pump 4, travels via conduit 7 past one-way valve 31 into the conduit brances 7' and from there passes via distributor 9, passages 10 and openings 12 into the chamber 14, wherein it is forced through the cartridge 21 and becomes converted into the coffee beverage which, after passing through filter 17, runs through outlet 19 into cup 20.

To facilitate removal of member 16 for installation of new and extraction of spent cartridges 21, the member 16 is provided with a handle 23. Valve 31 prevents coffee particles from entering heater 3, pump 4 and the water supply in container 2. A safety valve 32 is provided in a conduit 34 connecting heater 3 with container 2; its purpose is to allow the discharge of water from heater 3 into the container 2, in the event the water pressure in heater 3 exceeds a predetermined limit (i.e. the response level of valve 32).

The quantity of water supplied to chamber 14 and then passing through the cartridge 21 is proportional to the time period for which the user holds the toggle T in the position III, i.e. the time period during which the pump 4 is energized. Water will stop flowing as soon as toggle T is returned to the position I or the position II. It is advantageous, therefore, if the switch L is of the type (known per se) in which the toggle is spring-loaded and returns to either the position I or the position II when released by the user.

The electric resistance and thermal inertia of the heater 3 are such that sufficient water is kept at the required temperature to permit brewing of as many cups of coffee as the cartridge 21 is capable of yielding (such quantity will, of course, be specified in the instructions). After a cartridge is spent and water in the heater 3 begins to cool, it is merely necessary to set toggle T to the position II; in the short time required to replace the spent cartridge with a fresh one the water in heater 3 will have been heated again to proper operating temperature and the machine will be ready for the next operating cycle.

It will be appreciated that the machine according to the invention meets the objects set forth hereinbefore. It is simple in its construction and operation, easy to clean and eliminates the need for filling in coffee from a supply and later removing the soggy grounds and cleaning the filter. Moreover, and of particular interest to connoisseurs of good coffee, the quality of beverage produced will always be uniform since the amount and compaction of ground coffee will be the same in all cartridges and since the cartridges themselves can be left in their containers (e.g. vacuum-packed) so that all properties of the coffee are maintained unchanged until the moment of use. It will be understood, of course, that the machine can be used to brew beverages other than coffee, for example tea.

While the invention has been illustrated and described as embodied in a coffee machine, it is not intended to be limited to the details shown, since modifications and structural changes may be made without departing from the spirit of the invention.

What is claimed as new and desired to be protected by Letters Patent is set forth in the appended claims.

1. A hot-beverage machine, particularly a coffee maker, comprising a housing having a reservoir for water;

means on said housing forming a brewing chamber having an inlet and an outlet and including a removable cover for the chamber;

filter means in said chamber intermediate said inlet and outlet thereof;

means for removably holding in said chamber, intermediate and spaced from both said inlet and said filter, a water-permeable cartridge containing a beverage-making substance;

a distributor member removably mounted on said housing and to which said chamber-forming means are connected, said distributor member having one surface provided with an annular recess forming an annular distributing chamber of a first cross-section, and an annulus of distributing passages of second cross-section smaller than said first cross-section and each communicating with said intake and with said annular recess, respectively;

electrically energized means for heating water from said reservoir; and means for forcing the heated water under pressure through said intake, said inlet and said cartridge into said chamber, so as to brew a beverage which leaves said chamber through said outlet.

2. A machine as defined in claim 1, wherein said chamber-forming means comprises an upper member mounted on said housing and, a lower member removably mounted on said upper member and constituting said cover.

3. A machine as defined in claim 2, said holding means being constituted by respective juxtaposed edge faces of said upper and lower members between which portions of the cartridge are clamped.

4. A machine as defined in claim 1; and further comprising means adjacent said inlet for directing high-speed jets of the heated water against said cartridge.

5. A machine as defined in claim 1; said heating means including a casing having a compartment for water to be heated and communicating with said intake passage; and wherein said means for forcing comprises pump means communicating with said reservoir and said compartment for withdrawing water from the reservoir and forcing it under pressure beween substantially 8-10 atmospheres via said compartment into said chamber.

6. A machine as defined in claim 5; and further comprising means for preventing backflow of water from said chamber into said heating means.

7. A machine as defined in claim 5; and further comprising pressure-relief means for relieving said compartment to said reservoir in the event pressure in the compartment exceeds a predetermined limit.

8. A machine as defined in claim 5; said heating means comprising an electric heater operative for heating water to a temperature of substantially 80°-90° C.

9. A machine as defined in claim 5; and further comprising control means operatively connected with said heating means and pump and including a control element movable between a rest position, a first operating position in which said heating means is engaged, and a second operating position in which said pump is energized and remains energized for as long as said control element is in said second operating position.

* * * * *